(12) United States Patent
Sokolov et al.

(10) Patent No.: US 7,306,352 B2
(45) Date of Patent: Dec. 11, 2007

(54) ILLUMINATOR

(75) Inventors: Kirill Sokolov, Suwon-si (KR); Alexel Borodouline, Suown-si (KR); Young-chol Lee, Gunpo-si (KR); Won-yong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 128 days.

(21) Appl. No.: 11/206,017

(22) Filed: Aug. 18, 2005

(65) Prior Publication Data

US 2006/0083005 A1    Apr. 20, 2006

(30) Foreign Application Priority Data

Oct. 19, 2004    (KR) .................... 10-2004-0083541

(51) Int. Cl.
*F21V 7/00* (2006.01)

(52) U.S. Cl. ...................... 362/341; 362/297

(58) Field of Classification Search ............... 362/240, 362/277, 297, 298, 341, 346
See application file for complete search history.

(56) References Cited

U.S. PATENT DOCUMENTS

| | | | |
|---|---|---|---|
| 5,808,759 A | 9/1998 | Okamori et al. | |
| 6,312,144 B1 * | 11/2001 | Li | 362/297 |
| 6,953,252 B2 * | 10/2005 | Way | 353/99 |
| 6,976,775 B2 * | 12/2005 | Koike | 362/545 |
| 7,048,412 B2 * | 5/2006 | Martin et al. | 362/247 |
| 2003/0227774 A1 * | 12/2003 | Martin et al. | 362/240 |
| 2005/0052873 A1 * | 3/2005 | Sokolov | 362/341 |

FOREIGN PATENT DOCUMENTS

| | | |
|---|---|---|
| JP | 04-367837 | 12/1992 |
| JP | 2003-202523 | 7/2003 |
| JP | 2004-119364 | 4/2004 |

* cited by examiner

*Primary Examiner*—John Anthony Ward
(74) *Attorney, Agent, or Firm*—Stanzione & Kim, LLP

(57) ABSTRACT

An illuminator includes a concave mirror to reflect incident light in a predetermined direction, an inner reflective mirror provided on an optical axis of the concave mirror and having a reflective surface at least one surface thereof, a light source installed on at least one surface of the inner reflective mirror to generate and illuminate light, and a retro-reflective mirror provided at a focal point of the light reflected from the concave mirror, or in a vicinity of the focal point, and having an aperture through which some of the light illuminated from the light source and reflected by the concave mirror passes and a retro-reflective surface to reflect remaining light not passing through the aperture back toward the concave mirror.

44 Claims, 8 Drawing Sheets

ILLUMINATOR

CROSS-REFERENCE TO RELATED APPLICATIONS

This application claims the benefit under 35 U.S.C. § 119 of Korean Patent Application No. 2004-83541, filed on Oct. 19, 2004, in the Korean Intellectual Property Office, the disclosure of which is incorporated herein in its entirety by reference.

BACKGROUND OF THE INVENTION

1. Field of the Invention

The present general inventive concept relates to an illuminator to illuminate light emitted from a light source in a direction, and more particularly, to an illuminator which can reduce etendue of light emitted from a light emitting diode (LED) and simultaneously increase a flux density of the light.

2. Description of the Related Art

In general, an illuminator generates light and concentrates the generated light in a direction. The illuminator is employed in a liquid crystal display (LCD) device which cannot emit light by itself, or in an image projecting apparatus which generates an image using an image forming device, such as a digital micro-mirror device. For the illuminator to be employed in the image projecting apparatus, the illuminator needs to illuminate a collimated light.

The illuminator using an LED has many benefits as compared to a discharge lamp type illuminator. That is, the illuminator using an LED has a relatively long life span, can be made compact, can be operated at a low voltage, and has a light source that exhibits a fast switching speed. However, the illuminator also has drawbacks, such as a relatively large etendue and a relatively low flux density of light.

The performance of the image projecting apparatus employing an LED illuminator is determined by the etendue and brightness of the light source and an optical extent of the image forming device. To achieve the maximum optical efficiency in the image projecting apparatus, the etendue of the light source is required to be equal to or less than a limit etendue of the image forming device. Otherwise, a loss of light is generated. The etendue indicates the geometric property of an optical device related to the divergence of a beam and the size of a section of the beam. As the value of the etendue decreases, the flux density of light and brightness increase.

The etendue of a light source is determined by the size of a section of the beam at a target where the beam is focused and a solid angle of the beam. When an LED is employed as a light source, the chip size of the LED and the configuration of an optical system become major variables in determination of etendue.

As a solution to reduce the etendue value, U.S. Patent Publication No. US 2003/0128341A1, published on Jul. 10, 2003, and entitled "LED Illumination Engine Using a Reflector" (Inventor: Li, Kenneth K.) discloses a conventional LED illuminator configured as shown in FIG. 1.

Referring to FIG. 1, in a conventional LED illuminator, an LED 1 is approximately arranged at a focal point of a first reflective mirror 3 and emits light in a first wavelength range. The light emitted from the LED 1 is reflected by the first reflective mirror 3 to be a parallel beam and proceeds toward a second reflective mirror 5. The light is substantially focused on a focal point of the second reflective mirror 5. A target 7 is positioned at the focal point of the second reflective mirror 5. The target 7 is a tapered light pipe having an incident end 7a at which all incident light is received and an exit end 7b from which the incident light exists. The size of a section of the light pipe gradually increases from the incident end 7a toward the exit end 7b. Since the light is incident on the incident end 7a of the light pipe at predetermined focusing angle, and exits from the exit end 7b with a reduced focusing angle, the solid angle determining the etendue decreases so that the etendue can be reduced.

However, when the conventional LED illuminator is configured as described above, since the LED 1 is a surface light source, not all of a light emitting portion of the LED 1 can be placed at the focal point of the first reflective mirror 3. Accordingly, some of the light illuminated from the LED 1 and reflected by the first and second reflective mirrors 3 and 5 is not incident on the light pipe, and a light efficiency is lowered. Also, since the tapered light pipe is needed, manufacturing costs are high. Furthermore, a large number of assembly steps are required for the accurate arrangement of the light pipe.

SUMMARY OF THE INVENTION

The present general inventive concept provides an illuminator which can reduce manufacturing costs, simplify a number of assembly steps, reduce etendue of light emitted from an LED and loss of the light simultaneously, and increase a flux density of the light.

Additional aspects of the present general inventive concept will be set forth in part in the description which follows and, in part, will be obvious from the description, or may be learned by practice of the general inventive concept.

The foregoing and/or other aspects of the present general inventive concept are achieved by providing an illuminator including a concave mirror to reflect incident light to proceed in a predetermined direction, an inner reflective mirror provided on an optical axis of the concave mirror and having a reflective surface on at least one surface thereof, a light source installed on at least one surface of the inner reflective mirror to generate and illuminate the light incident on the concave mirror, and a retro-reflective mirror provided at a focal point of the light reflected from the concave mirror, or in a vicinity of the focal point, and having an aperture through which some of the light illuminated from the light source and reflected by the concave mirror passes and a retro-reflective surface to reflect light reflected by the concave mirror and not passing through the aperture back toward the concave mirror.

The foregoing and/or other aspects of the present general inventive concept are also achieved by providing an illuminator including a first concave mirror having first and second focal points and having a partially oval shape to reflect light incident thereon from the first focal point and a vicinity of the first focal point to proceed toward the second focal point and a vicinity of the second focal point, a first inner reflective mirror disposed on an optical axis of the first concave mirror to reflect incident light, a first light source substantially installed at the first focal point on the first inner reflective mirror to generate and emit the light reflected by the first concave mirror, a retro-reflective mirror provided in the vicinity of the second focal point and having an aperture to pass through some of the light emitted from the first light source and reflected by the first concave mirror and a retro-reflective surface to reflect remaining light not passing through the aperture, a second concave mirror arranged to face the first concave mirror, having a partially oval shape and having a third focal point and a fourth focal point substantially disposed at the same position as the second focal point to focus the light reflected from the retro-reflection surface on the third focal point or in a vicinity of the third focal point, and a second inner reflective mirror disposed on an optical axis of the second concave mirror to reflect incident light toward the second concave mirror.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
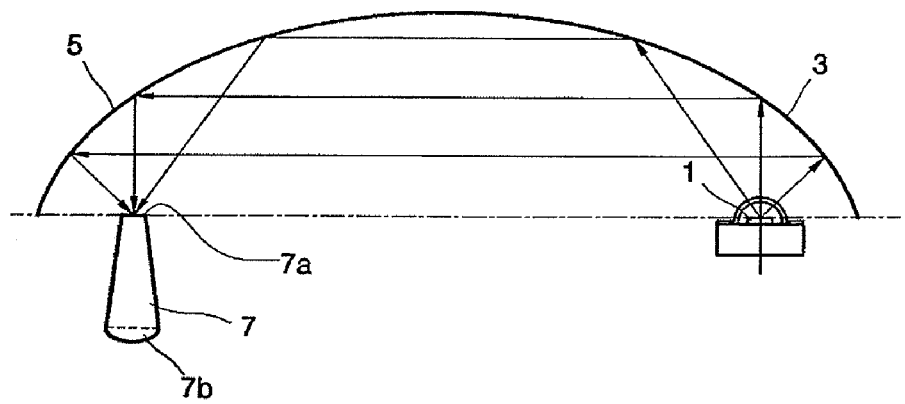
FIG. 1 is a view schematically illustrating a conventional LED illumination engine using a reflective mirror.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
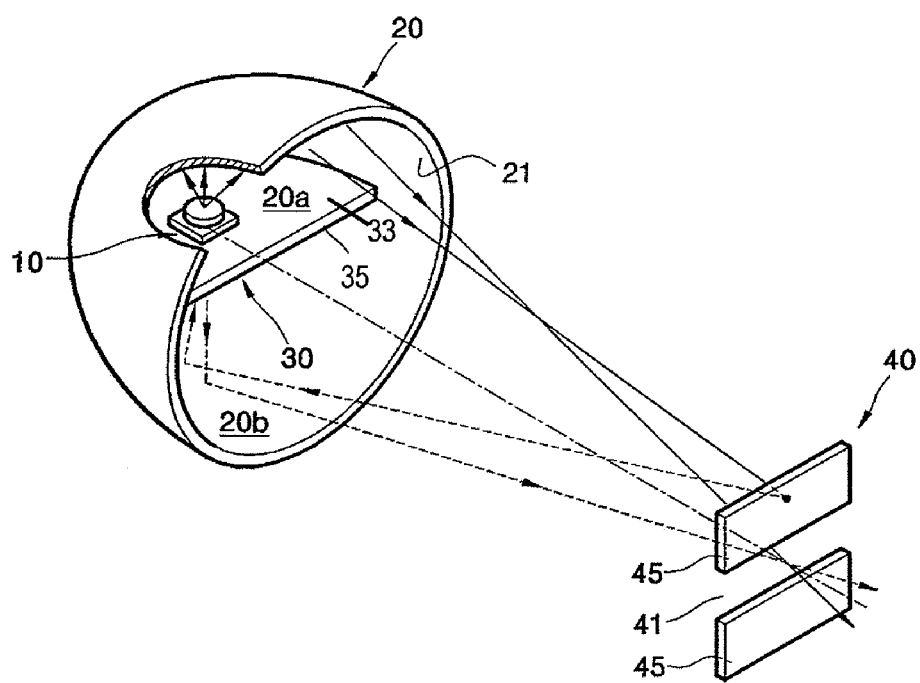
FIG. 2 is a perspective view illustrating an illuminator according to an embodiment of the present general inventive concept.
Figure 3:
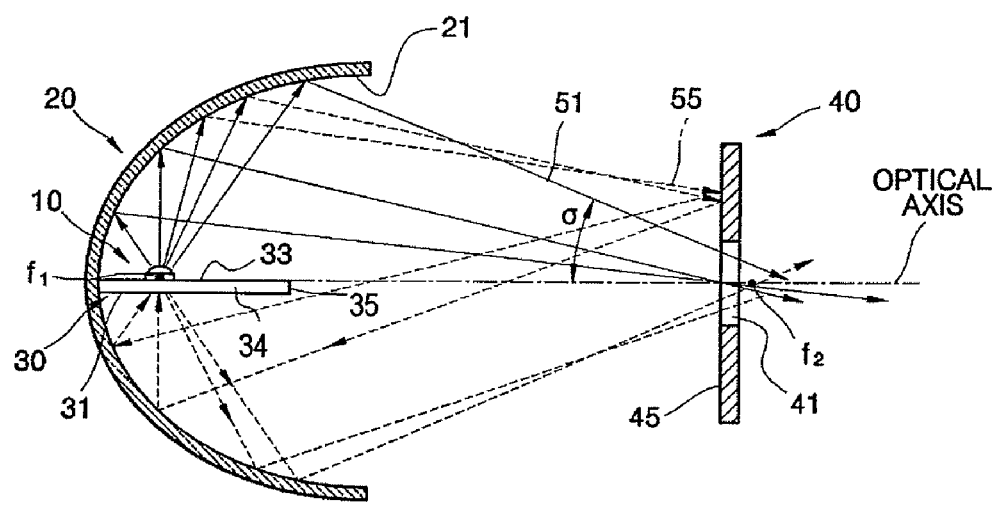
FIG. 3 is a sectional view illustrating the illuminator of FIG. 2.
Figure 4:
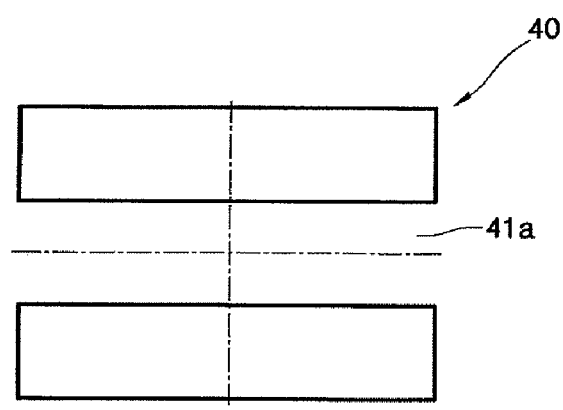
FIGS. 4 through 7 are views illustrating an aperture structure of a retro-reflective mirror of the illuminator of FIG. 2 according to various embodiments of the present general inventive concept.
Figure 5:
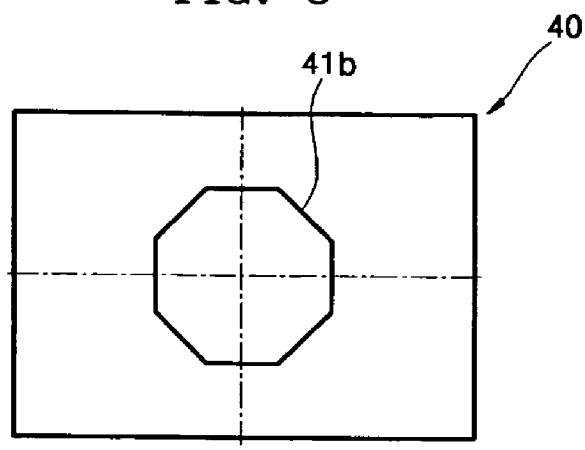
Figure 6:
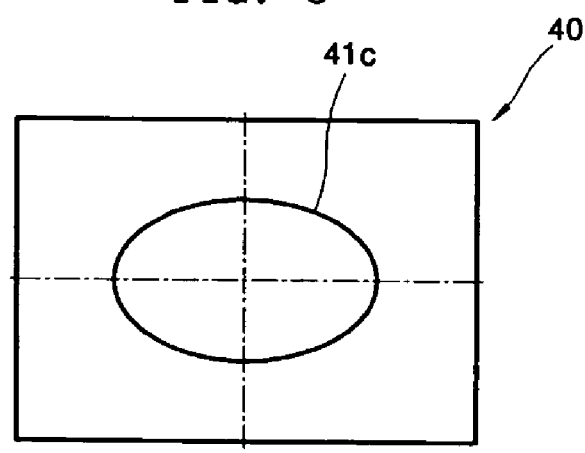
Figure 7:
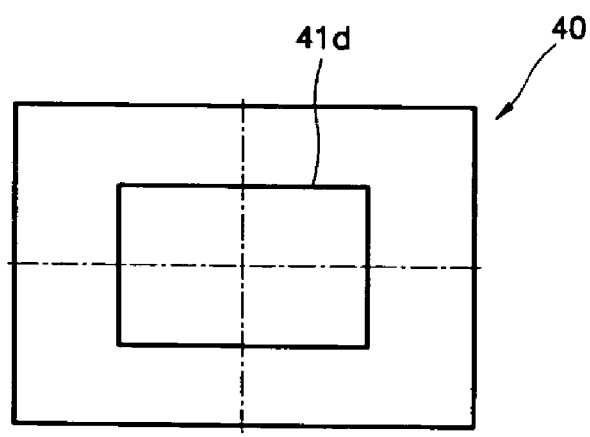

FIG. 2 is a perspective view illustrating an illuminator according to an embodiment of the present general inventive concept. FIG. 3 is a sectional view illustrating the illuminator of FIG. 2.

Referring to FIGS. 2 and 3, the illuminator includes a light source 10 to generate and emit light, a concave mirror 20 to reflect the light emitted from the light source 10 in a predetermined direction, an inner reflective mirror 30 provided on an optical axis of the concave mirror 20, and a retro-reflective mirror 40 arranged to face the concave mirror 20. The retro-reflective mirror 40 is provided on a proceeding path of the light reflected from the concave mirror 20, and includes an aperture 41 to pass some of the light reflected from the concave mirror 20 therethrough and a retro-reflective surface 45 to retro-reflect the remaining light reflected from the concave mirror 20 back toward the concave mirror 20. The retro-reflective surface 45 can be flat such that the retro-reflective surface 45 is perpendicular to the optical axis of the concave mirror 20. The aperture 41 can be provided at a center portion of the retro-reflective surface 45 and the light that passes therethrough can have a variety of shapes according to a shape of the aperture 41.

The concave mirror 20 may be an elliptical mirror having a first focal point $f_1$ and a second focal point $f_2$. The retro-reflective mirror 40 is arranged in a vicinity of the second focal point $f_2$. The aperture 41 of the retro-reflective surface 40 can be located approximately at the second focal point $f_2$.

The inner reflective mirror 30 can be provided inside the concave mirror 20 along the optical axis of the concave mirror 20, that is, along a line connecting the first and second focal points $f_1$ and $f_2$, and divides an inner space of the concave mirror 20 into first and second spaces 20a and 20b. The inner reflective mirror or divider 30 may be a flat mirror such as a mirrored disk arranged parallel to the optical axis of the concave mirror 20 and having a reflective surface 31 formed at and/or on at least one surface thereof. The inner reflective mirror 30 may also be of a semicircular shape having a curved inner edge surface 34 with two ends connected by one outer edge surface 35.

The light source 10 is installed at the inner reflective mirror 30 to be located approximately at a position of the first focal point $f_1$. Thus, the light emitted from the light source 10 and reflected by the concave mirror 20 is focused on the second focal point $f_2$ or in the vicinity thereof.

The light source 10 may include at least one LED installed on a surface of the inner reflective mirror 30, that is, on a rear surface 33 opposite to the reflective surface 31 of the inner reflective mirror 30. The LED may provide a predetermined amount of light as a surface light source and simultaneously have a light emitting surface over a size of 0.5×0.5 mm$^2$ considering an etendue property. The LED is capable of illuminating light of a predetermined wavelength, such as a white, red, orange, yellow, green, cyan, blue, violet, infrared, or ultraviolet wavelength. The light source 10 can be provided at each of both sides of the inner reflective mirror 30. That is, the light source 10 may be provided at positions of the reflective surface 31 and the rear surface 33 opposite to each other. When the light source 10 is provided on both of the surfaces 31 and 33 of the inner reflective mirror 30, the total brightness of the emitted light can be increased.

In the illuminator according to the embodiment of FIGS. 2 and 3, most of the light emitted from the light source 10 located at the first focal point $f_1$ is directly incident on the first space 20a of the concave mirror 20 and is reflected from an inner reflective surface 21 of the concave mirror 20 to proceed toward the second focal point $f_2$ and the aperture 41 of the retro-reflective mirror 40 located at the second focal point $f_2$. Since the LED used as the light source 10 is a surface light source, when the concave mirror 20 is formed to be an elliptical mirror, all of the reflected light does not proceed toward the second focal point $f_2$, but is distributed in the vicinity of the second focal point $f_2$, as illustrated in FIG. 3.

That is, a first portion of light 51, indicated by solid lines in FIG. 3, is a portion of the light reflected from the concave mirror 20 and is directly incident on the aperture 41. A second portion of light 55, indicated by dotted lines in FIG. 3, is the remaining portion of the light reflected from the concave mirror 20, and is incident on the retro-reflective surface 45 and reflected therefrom toward the second space 20b of the concave mirror 20. The light reflected from the retro-reflective surface 45 is reflected by the second space 20b to be incident on the reflective surface 31 of the inner reflective mirror 30. The reflective surface 31, that is, the surface where the light source 10 is not installed, reflects the incident light toward the second space 20b. The second space 20b reflects the light reflected from the reflective surface 31 toward the retro-reflective mirror 40 in a different path from the path in which the light was reflected toward the second space 20b from the retro-reflective surface 45 such that the light proceeds toward the second focal point $f_2$. Some of the light passes through the aperture 41 while the remaining light is retro-reflected from the retro-reflective surface 45 toward the first space 20a. After repeating the above reflection process, nearly all light emitted from the light source 10 and reflected from the concave mirror 20 and the inner reflection mirror 30 passes through the aperture 41. Since a solid angle s that is the maximum focusing angle of the light passing through the aperture 41 can be reduced as compared to a case without the retro-reflective mirror 40, the size of an illumination section of incident light can be reduced. Accordingly, since the etendue can be reduced, this embodiment of the present general inventive concept can be used as an illuminator of a projection optical system requiring a smaller etendue, for example, an image projecting apparatus which forms a color image using a color wheel.

FIGS. 4-7 illustrate shapes of the aperture 41 of the retro-reflective mirror 40 according to various embodiments of the present general inventive concept. FIGS. 4-7 illustrate a slit type aperture 41a, a polygonal type aperture 41b, a circular (or elliptical) type aperture 41c, and a rectangular aperture 41d, respectively. The shapes of FIGS. 4-7 are examples of shapes which can be used for the aperture 41, but the aperture 41 is not limited thereto.

Figure 8:
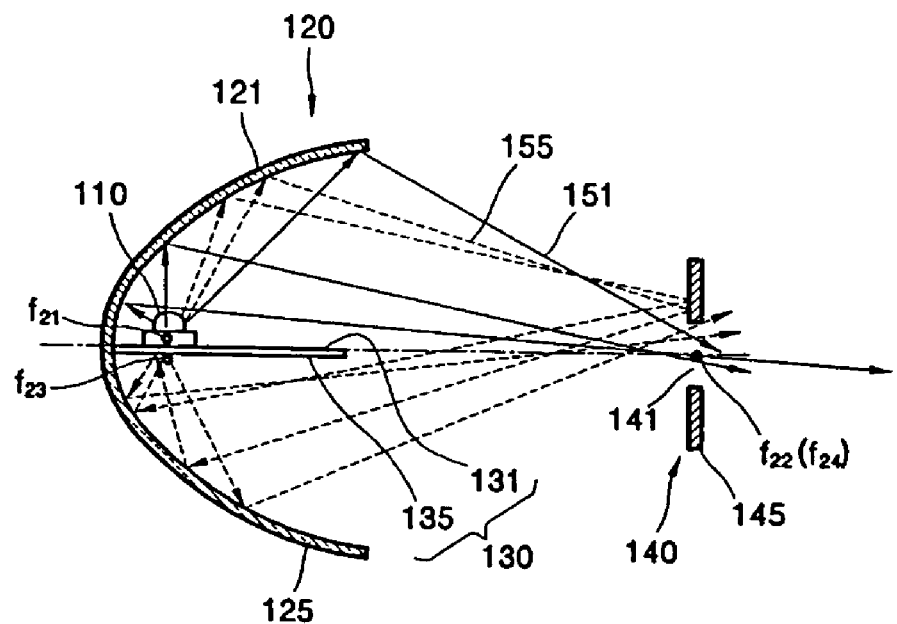
FIG. 8 is a sectional view illustrating an illuminator according to another embodiment of the present general inventive concept.

FIG. 8 is a sectional view illustrating an illuminator according to another embodiment of the present general inventive concept. Referring to FIG. 8, the illuminator of this embodiment includes a light source 110 to generate and emit light, a concave mirror 120 to reflect the light emitted from the light source 110 in a predetermined direction, an inner reflective mirror 130 provided in the concave mirror 120 on an optical axis of the concave mirror 120 and dividing inner space of the concave mirror 120, and a retro-reflective mirror 140 arranged to face the concave mirror 120. The characteristic features of the illuminator according to the present embodiment lie in the modification of the structures of the concave mirror 120 and the inner reflective mirror 130. The structures and operations of the other structural elements are substantially the same as those described in the embodiment of FIGS. 2 and 3.

The concave mirror 120 includes a first concave mirror 121 which is partially oval shaped and has a first focal point $f_{21}$ and a second focal point $f_{22}$ and a second concave mirror 125 which is arranged to face the first concave mirror 121, is partially oval shaped, and has a third focal point $f_{23}$ and a fourth focal point $f_{24}$. The third focal point $f_{23}$ can be arranged to oppose the first focal point $f_{21}$ on opposite sides of the inner reflective mirror 130, while the fourth focal point $f_{24}$ can be arranged at a position that is substantially the same as the second focal point $f_{22}$.

The light source 110 is disposed substantially at the first focal point $f_{21}$ on the first inner reflective mirror 131 and generates and emits the light toward the first concave mirror 121. Since the light source 110 can have substantially the same structure and function as the light source 10 of the embodiment of FIG. 2, a detailed description thereof will be omitted herein.

As illustrated in FIG. 8, the first concave mirror 121 reflects the light emitted from the light source 110 disposed at the first focal point $f_{21}$ or in a vicinity thereof toward the second focal point $f_{22}$ and a vicinity thereof. The second concave mirror 125 focuses the light reflected by the retro-reflective mirror 140, that is, the light reflected from the vicinity of the second focal point $f_{22}$, to the third focal point $f_{23}$ and a vicinity thereof.

The inner reflective mirror 130 includes a first inner reflective mirror 131 disposed along the optical axis of the first concave mirror 121 and a second inner reflective mirror 135 disposed along the optical axis of the second concave mirror 125. The optical axis of the first concave mirror 121 matches a segment connecting the first focal point $f_{21}$ and the second focal point $f_{22}$, while the optical axis of the second concave mirror 125 matches a segment connecting the third focal point $f_{23}$ and the fourth focal point $f_{24}$. The first and second inner reflective mirrors 131 and 135 may be flat mirrors arranged parallel to the optical axis of each of the first and second concave mirrors 121 and 125. A reflective surface is formed on each of the first and second inner reflective mirrors 131 and 135 facing the first and second concave mirrors 121 and 125, respectively.

The retro-reflective mirror 140 includes an aperture 141 to pass some of the light reflected from the concave mirror 120 therethrough and a retro-reflective surface 145 to reflect the remaining light reflected from the concave mirror 120 back toward the concave mirror 120. Since the retro-reflective mirror 140 can have substantially the same structure and function as the retro-reflective mirror 40 of the embodiment of FIG. 2, a detailed description thereof will be omitted herein.

Thus, most of the light emitted from the light source 110 approximately located at the first focal point $f_{21}$ is directly incident on the first concave mirror 121 and reflected by the inner reflective surface toward the second focal point $f_{22}$ and the vicinity thereof. A first portion of the reflected light 151 indicated by solid lines in FIG. 8 is directly input to the aperture 141. A second portion of the light 155 indicated by dotted lines in FIG. 8 is incident on the retro-reflective surface 145 and reflected from the retro-reflective surface 145 toward the second concave mirror 125. The reflected light is reflected again by the second concave mirror 125 to be incident on the second inner reflective mirror 135. The second inner reflective mirror 135 reflects the incident light to a different position of the second concave mirror 125. The second concave mirror 125 then reflects the light toward the retro-reflective mirror 140 in a different path from the path in which the light was reflected toward the second concave mirror 125 from the retro-reflective surface 145 such that the light proceeds toward the fourth focal point $f_{24}$ and the vicinity thereof. Some of the light passes through the aperture 141 and the remaining light is reflected again from the retro-reflective surface 145. After repeating the above reflection process, nearly all light emitted from the light source 110 and reflected from the first and second concave mirrors 121 and 125 and the first and second inner reflection mirrors 131 and 135 passes through the aperture 141 to contribute to illumination.

Figure 9:
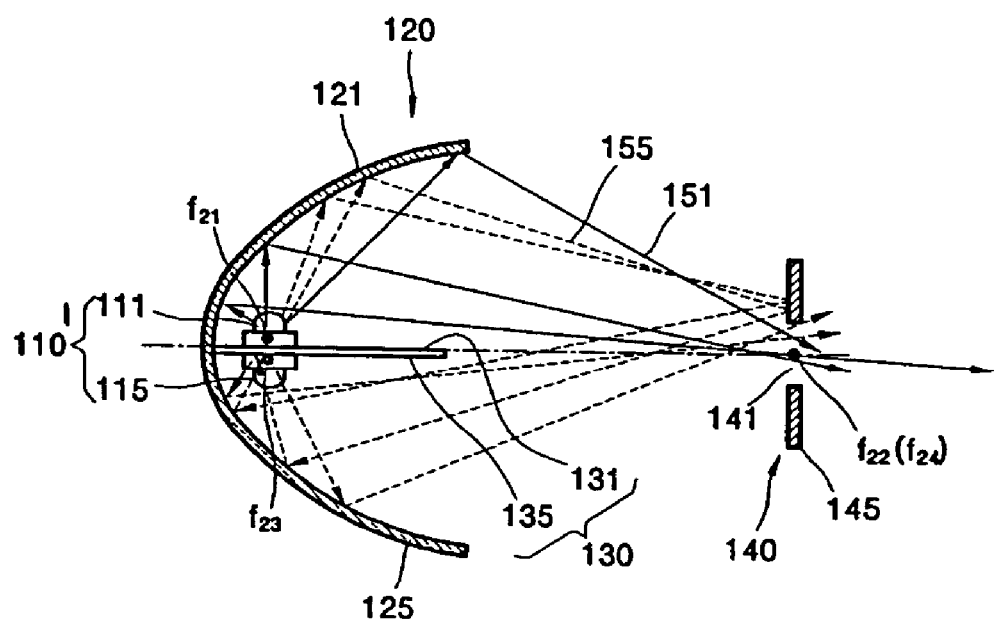
FIG. 9 is a sectional view illustrating an illuminator according to another embodiment of the present general inventive concept.

FIG. 9 is a sectional view illustrating an illuminator according to another embodiment of the present general inventive concept. The illuminator according to this embodiment is similar to the embodiment of FIG. 8, except that a light source 110' of this embodiment includes first and second light sources 111 and 115 disposed on the first and second inner reflective mirrors 131 and 135, respectively, as compared to the light source 110 of the embodiment of FIG. 8. Since the structure and operation of corresponding elements excluding the light source 110', are substantially the same as those of the illuminator of the embodiment of FIG. 8, the first and second light sources 111 and 115 will be mainly described below.

Referring to FIG. 9, the first light source 111 is disposed at the first focal point $f_{21}$ on the first inner reflective mirror 131 or in the vicinity thereof and generates and emits light toward the first concave mirror 121. The second light source 115 is disposed at the third focal point $f_{23}$ or in the vicinity thereof and generates and emits light toward the second concave mirror 125. Since the structures and functions of each of the first and second light sources 111 and 115 are substantially the same as the light source 10 of the embodiment of FIG. 2, detailed descriptions thereof will be omitted herein. Consequently, when light is illuminated using two light sources, that is, the first and second light sources 111 and 115, a total brightness can be increased.

Figure 10:
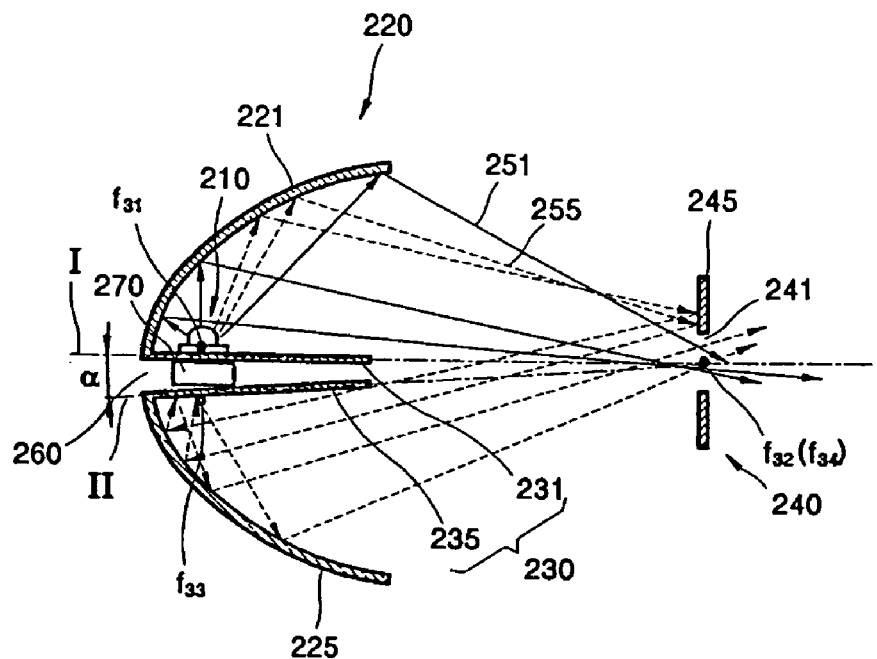
FIG. 10 is a sectional view illustrating an illuminator according to another embodiment of the present general inventive concept.

FIG. 10 is a sectional view illustrating an illuminator according to another embodiment of the present general inventive concept. Referring to FIG. 10, the illuminator according to this embodiment includes a light source 210 to generate and emit light, a concave mirror 220 to reflect the light emitted from the light source 210 in a predetermined direction, an inner reflective mirror 230 provided on an optical axis inside the concave mirror 220 and dividing an inner space of the concave mirror 220 into two sections, and a retro-reflective mirror 240 arranged to face the concave mirror 220.

The concave mirror 220 includes a first concave mirror 221 which is partially oval shaped and has a first focal point $f_{31}$ and a second focal point $f_{32}$, and a second concave mirror 225 which is arranged to face the first concave mirror 221 is partially oval shaped, and has a third focal point $f_{33}$ and a fourth focal point $f_{34}$. The third focal point $f_{33}$ is arranged to oppose the first focal point $f_{31}$ on opposite sides of the inner reflective mirror 230, while the fourth focal point $f_{34}$ is arranged at substantially the same position as the second focal point $f_{32}$. As illustrated in FIG. 10, the first concave mirror 221 reflects light incident from the first focal point $f_{31}$ and a vicinity thereof to proceed toward the second focal point $f_{32}$ and a vicinity thereof. The second concave mirror 225 focuses the light reflected from the retro-reflective mirror 240, that is, light reflected from the vicinity of the second focal point $f_{32}$, towards the third focal point $f_{33}$ or in a vicinity thereof.

The inner reflective mirror 230 includes a first inner reflective mirror 231 disposed along a first optical axis I of the first concave mirror 221 and a second inner reflective mirror 235 disposed along a second optical axis II of the second concave mirror 225. The first optical axis I of the first concave mirror 221 matches a segment connecting the first focal point $f_{31}$ and the second focal point $f_{32}$ while the second optical axis II of the second concave mirror 225 matches a segment connecting the third focal point $f_{33}$ and the fourth focal point $f_{34}$. The first and second inner reflective mirrors 231 and 235 can be flat mirrors arranged parallel to the first and second optical axes I and II of the first and second concave mirrors 221 and 225, respectively. A reflective surface is formed on each of surfaces of the first and second inner reflective mirrors 231 and 235 respectively facing the first and second concave mirrors 221 and 225. The light source 210 is disposed at the first focal point f31 or in the vicinity thereof on the first inner reflective mirror 231, and generates and emits light toward the first concave mirror 221.

The second concave mirror 225 is arranged to be inclined with respect to the first concave mirror 221 so that the first and second optical axes I and II form a predetermined angle a at the second focal point $f_{32}$. Thus, a space 260 is formed between the first and second inner reflective mirrors 231 and 235. Thus, since heat generated from the light source 210 installed on the first inner reflective mirror 231 can be dissipated through the space, a cooling efficiency of the light source 210 can be improved. Also, to further improve the cooling efficiency, a heat sink 270 can be further provided in the space 260.

The retro-reflective mirror 240 includes an aperture 241 to pass some of the light reflected from the concave mirror 220 therethrough and a retro-reflective surface 245 to reflect the remaining light reflected from the concave mirror 220 back to the concave surface 220. Since the retro-reflective mirror 240 has substantially the same structure and function as the retro-reflective mirror 40 of the embodiment of FIG. 2, a detailed description thereof will be omitted herein.

Thus, most of the light emitted from the light source 210 approximately disposed on the first focal point $f_{31}$ is directly incident on the first concave mirror 221 and reflected from the inner reflective surface toward the second focal point $f_{32}$ and the vicinity thereof. A first portion of the reflected light 251 indicated by solid lines in FIG. 10 is directly input to the aperture 241 while a second portion of the light 255 indicated by dotted lines in FIG. 10 is incident on the retro-reflective surface 245 and is reflected from the retro-reflective surface 245 toward the second concave mirror 225. The reflected light is reflected again from the second concave mirror 225 to be incident on the second inner reflective mirror 235. The second inner reflective mirror 235 reflects incident light to a different position on the second concave mirror 225. The second concave mirror 225 then reflects the light toward the retro-reflective mirror 240 along a different path from the path in which the light was reflected toward the second concave mirror 225 from the retro-reflective surface 245, such that the light proceeds toward the fourth focal point $f_{34}$ and the vicinity thereof. Some of the light passes through the aperture 241 while the remaining light is reflected from the retro-reflective surface 245. After repeating the above reflection process, nearly all of the light emitted from the light source 210 and reflected from the first and second concave mirrors 221 and 225 and the first and second inner reflection mirrors 231 and 235 passes through the aperture 241 to contribute to illumination. By providing the space 260 between the first and second inner reflective mirrors 231 and 235, the heat sink 270 to dissipate the heat generated from the light source 210 can be easily installed.

Figure 11:
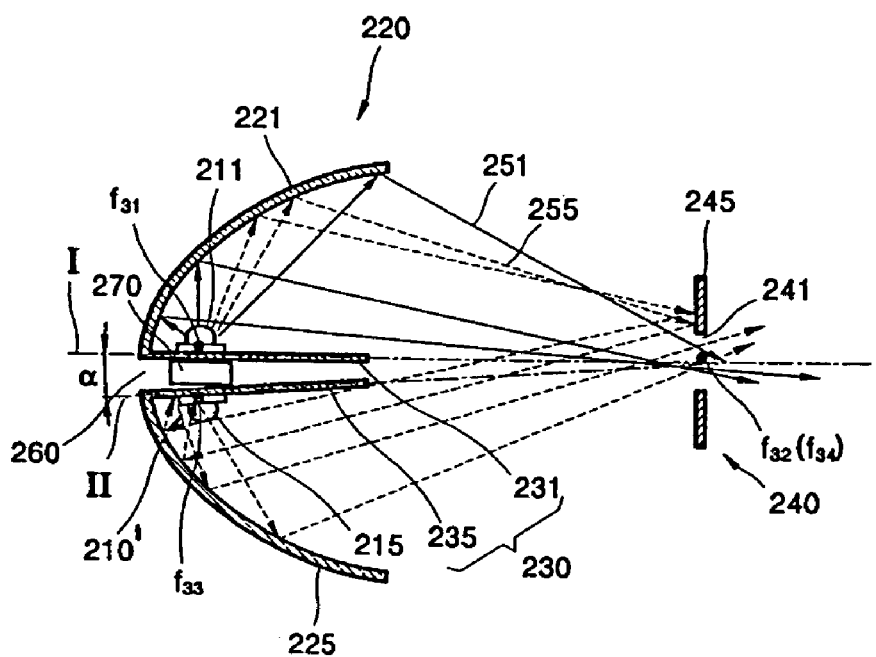
FIG. 11 is a sectional view illustrating an illuminator according to another embodiment of the present general inventive concept.

FIG. 11 is a sectional view illustrating an illuminator according to another embodiment of the present general inventive concept. The illuminator according to this embodiment is similar to the illuminator illustrated in the embodiment of FIG. 10, except that a light source 210' of this embodiment includes first and second light sources 211 and 215 disposed on the first and second inner reflective mirrors 231 and 235, respectively, as compared to the light source 210 of the embodiment of FIG. 10. Since the structure and operation of corresponding elements excluding the light source 210' are substantially the same as those of the illuminator according to the embodiment of FIG. 10, the first and second light sources 211 and 215 will be mainly described below.

Referring to FIG. 11, the first light source 211 is disposed at the first focal point $f_{31}$ on the first inner reflective mirror 231 or in the vicinity thereof and generates and emits light toward the first concave mirror 221. The second light source 215 is disposed at the third focal point $f_{33}$ or in the vicinity thereof and generates and emits light toward the second concave mirror 225. Since the structures and functions of each of the first and second light sources 211 and 215 are substantially the same as the light source 10 of the embodiment of FIG. 2, detailed descriptions thereof will be omitted herein. Consequently, when light is illuminated using the first and second light sources 211 and 215, a total brightness can be increased as compared to the illuminator according to the embodiment of FIG. 10.

Figure 12:
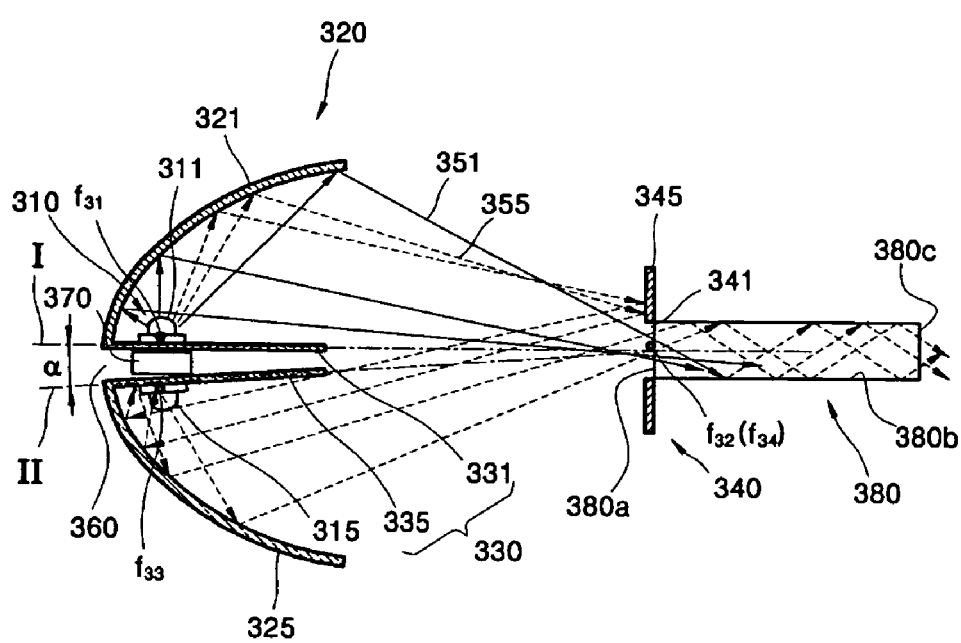
FIG. 12 is a sectional view illustrating an illuminator according to another embodiment of the present general inventive concept.

FIG. 12 is a sectional view illustrating an illuminator according to another embodiment of the present general inventive concept. Referring to FIG. 12, the illuminator according to this embodiment includes a light source 310 to generate and emit light, a concave mirror 320 to reflect the light emitted from the light source 310 in a predetermined direction, an inner reflective mirror 330 provided on an optical axis of the concave mirror 320 inside the concave mirror 320 and dividing inner space of the concave mirror 320 into two sections, a retro-reflective mirror 340 arranged to face the concave mirror 320, and an optical integrator 380.

The concave mirror 320 includes a first concave mirror 321 which is partially oval shaped and has a first focal point $f_{31}$ and a second focal point $f_{32}$, and a second concave mirror 325 which is arranged to face the first concave mirror 321, is partially oval shaped, and has a third focal point $f_{33}$ and a fourth focal point $f_{34}$. The first focal point $f_{31}$ and third focal point $f_{33}$ are arranged to oppose each other on first and second inner reflective mirrors 331 and 335 of the inner reflective mirror 230, respectively, while the fourth focal point $f_{34}$ is arranged at substantially the same position as the second focal point $f_{32}$. The second concave mirror 325 can be inclined with respect to the first concave mirror 321 to provide a space 360 between the first and second concave mirrors 321 and 325, and a heat sink 370 can be provided in the space 360.

The retro-reflective mirror 340 includes an aperture 341 and a retro-reflective surface 345. A first portion of light 351 passes through the aperture 341 and a second portion of light 355 is reflected by the retro-reflective surface 345.

The illuminator according to this embodiment is characteristic in including the optical integrator 380 as compared to the illuminators according to the embodiments of FIGS. 2 and 8-11. In the present embodiment, since other corresponding elements such as the light source 310, the concave mirror 320, the inner reflective mirror 330, the retro-reflective mirror 340, the space 360, and the heat sink 370 are similar to those described above with reference to the embodiments of FIGS. 2 and 8-11, detailed descriptions thereof will be omitted herein.

The optical integrator 380 is provided on a proceeding path of light passing through the aperture 341 of the retro-reflective mirror 340 and makes incident light uniform by mixing the incident light. The optical integrator 380 includes an incident end portion 380a provided at a position corresponding to the aperture 341 of the retro-reflective mirror 340, at which the light passing through an aperture 341 is incident, a reflective portion 380b to guide the propagation of the light incident on the incident end portion 380a by reflecting the light, and an exit end portion 380c through which the light that is mixed by being reflected by the reflective portion 380b exits.

Figure 13:
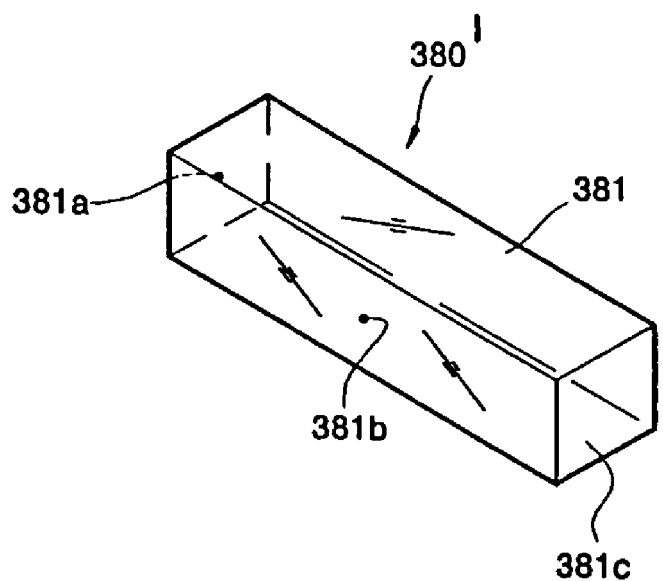
FIG. 13 is a perspective view illustrating an optical integrator of the illuminator of FIG. 12 according to an embodiment of the present general inventive concept.

FIG. 13 illustrates an optical integrator 380' according to an embodiment of the present general inventive concept. Referring to FIG. 13, the optical integrator 380' can include a rod 381 having a rectangular shape and including an incident end portion 381a, a reflective portion 381b, and an exit end portion 381c. The rod 381 can be formed of glass or plastic and has a refractive index higher than its surroundings. Thus, light incident on the incident end portion 381a proceeds toward the exit end portion 381c while being totally reflected by the reflective portion 381b due to an incident angle of the incident light and a difference in the refractive index of the rod and its surroundings. Accordingly, irregular light passing through the aperture 345 is totally reflected and uniformly mixed to be regular light.

Figure 14:
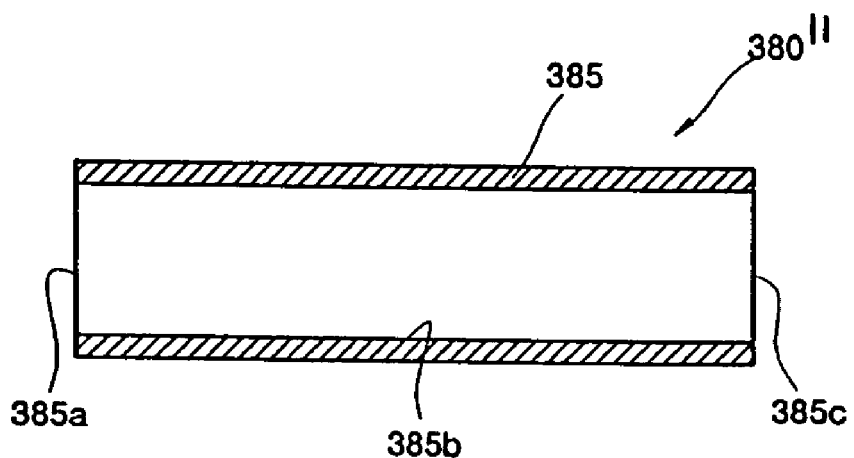
FIG. 14 is a sectional view illustrating an optical integrator of the illuminator of FIG. 12 according to another embodiment of the present general inventive concept.

FIG. 14 illustrates an optical integrator 380" according to another embodiment of the present general inventive concept. Referring to FIG. 14, the optical integrator 380" can include a barrel 385 encompassing an inner space through which incident light proceeds and a reflective surface 385b formed on an inner wall of the barrel 385. Thus, the light input through an incident end portion 385a of the barrel 385 proceeds by being reflected by the reflective surface 385b and becomes uniform light. The uniform light exits through an exit end portion 385c of the barrel 385.

Figure 15:
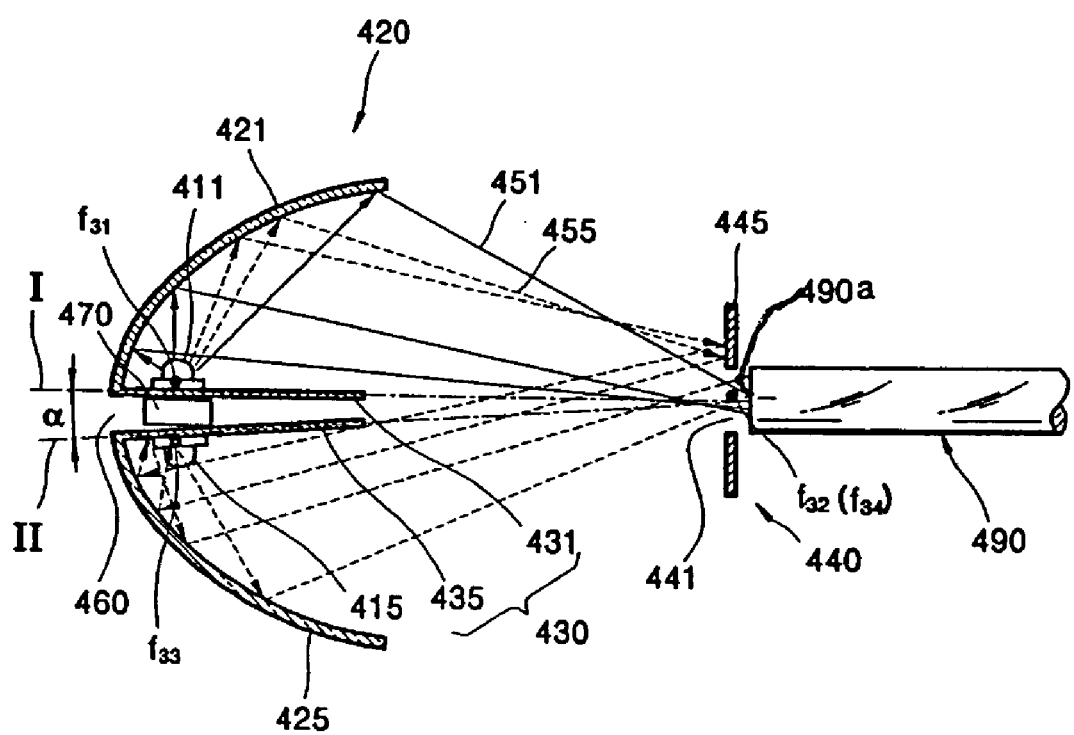
FIG. 15 is a sectional view illustrating an illuminator according to another embodiment of the present general inventive concept.

FIG. 15 is a sectional view of an illuminator according to another embodiment of the present general inventive concept. Referring to FIG. 15, the illuminator includes first and second light sources 411 and 415 to generate and emit light, a concave mirror 420 to reflect the light emitted from the first and second light sources 411 and 415 in a predetermined direction, an inner reflective mirror 430 provided on an optical axis of the concave mirror 430 inside the concave mirror 420 and dividing an inner space of the concave mirror 420 into two sections, a retro-reflective mirror 440 arranged to face the concave mirror 420, and an optical fiber 490.

The concave mirror 420 includes a first concave mirror 421, which is partially oval shaped and has a first focal point $f_{31}$ and a second focal point $f_{32}$, and a second concave mirror 425, which is arranged to face the first concave mirror 421, is partially oval shaped, and has a third focal point $f_{33}$ and a fourth focal point $f_{34}$. The first focal point $f_{31}$ and third focal point $f_{33}$ are arranged to oppose each other on first and second inner reflective mirrors 431 and 435 of the inner reflective mirror 430, respectively, while the fourth focal point $f_{34}$ is arranged at substantially the same position as the second focal point $f_{32}$. The second concave mirror 425 can be inclined with respect to the first concave mirror 421 to provide a space 460 between the first and second concave mirrors 421 and 425, and a heat sink 470 can be provided in the space 460.

The retro-reflective mirror 440 includes an aperture 441 and a retro-reflective surface 445. A first portion of light 451 passes through the aperture 441 and a second portion of light 455 is reflected by the retro-reflective surface 445.

The illuminator according to this embodiment is characteristic in including the optical fiber 490 as compared to the illuminators according to the embodiments of FIGS. 2 and 8-11. In the present embodiment, since other constituent elements, such as the first and second light sources 411 and 415, the concave mirror 420, the inner reflective mirror 430, the retro-reflective mirror 440, the space 460, and the heat sink 470 are the same as those described above with reference to the embodiment of FIGS. 2 and 8-11, detailed descriptions thereof will be omitted herein.

The optical fiber 490 transmits the light passing through the aperture 441 of the retro-reflective mirror 440 and has an incident end portion 490a which is provided at a position corresponding to the aperture 441 of the retro-reflective mirror 440. The optical fiber 490 can be formed of glass or plastic and makes the light passing through the aperture 441 and input through the incident end portion 490a totally reflected therein such that the optical fiber 490 transmits uniform illumination light through an inner portion thereof.

As described above, the illuminator according to the embodiments of the present general inventive concept can decrease a solid angle and increase a flux density of focused light by simultaneously using an LED emitting a surface light and a retro-reflective mirror having an aperture of a predetermined shape and size. Therefore, since etendue can be reduced, an illuminator according to an embodiment of the present general inventive concept can be used as an illuminator of a projection optical system requiring a smaller etendue. Also, by employing a plurality of light sources, brightness can be improved. In addition, by forming a space between inner reflective mirrors where a plurality of light sources are installed, a heat sink can be installed such that an efficiency in heat radiation of a light source can be improved.

Also, since an optical integrator or an optical fiber can be provided, uniform light having reduced etendue can be illuminated. Further, according to the embodiments of the present general inventive concept, an illuminator with a simplified configuration can be provided, such that manufacturing costs can be reduced while a number of assembly steps can be decreased.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An illuminator comprising:
    a concave mirror to reflect incident light in a predetermined direction;
    an inner reflective mirror provided on an optical axis of the concave mirror and having a reflective surface on at least one surface thereof;
    a light source installed on at least one surface of the inner reflective mirror to generate and illuminate light; and
    a retro-reflective mirror provided at a focal point of a light reflected from the concave mirror, or in a vicinity of the focal point, and having an aperture through which some of light illuminated from the light source and reflected by the concave mirror passes and a retro-reflective surface to reflect remaining light not passing through the aperture back toward the concave mirror.

2. The illuminator as claimed in claim 1, wherein the concave mirror is an elliptical mirror having first and second focal points, the light source is approximately disposed at the first focal point to cause the light illuminated from the light source and reflected from the elliptic mirror to be focused in a vicinity of the second focal point, and the retro-reflective mirror is disposed at the second focal point or in the vicinity of the second focal point.

3. The illuminator as claimed in claim 1, wherein at least one surface of the inner reflective mirror is a flat mirrored disk arranged parallel to an optical axis of the concave mirror.

4. The illuminator as claimed in claim 1, wherein the retro-reflective surface is flat and arranged perpendicular to an optical axis of incident light, and the aperture is provided at a central portion of the retro-reflective surface and has one of a slit shape, a polygonal shape, a rectangular shape, and a circular shape.

5. The illuminator as claimed in claim 1, wherein the light source comprises at least one light emitting diode installed on a first surface of the inner reflective mirror or a second surface opposite to the first surface of the inner reflective mirror.

6. The illuminator as claimed in claim 5, wherein each light emitting diode comprises a light emitting surface equal to or greater than a size of $0.5 \times 0.5$ mm$^2$.

7. The illuminator as claimed in claim 5, wherein each light emitting diode illuminates light of one of a white, a red, a orange, a yellow, a green, a cyan, a blue, a violet, an infrared, and an ultraviolet wavelength.

8. The illuminator as claimed in claim 1, further comprising:
    an optical integrator provided on a proceeding path of the light passing through the retro-reflective mirror to emit light by mixing incident light.

9. The illuminator as claimed in claim 8, wherein the optical integrator comprises an incident end portion disposed at a position of the retro-reflective mirror to allow light passing through the aperture to be incident on the optical integrator.

10. The illuminator as claimed in claim 8, wherein the optical integrator comprises a rod having a rectangular shape, formed of glass or plastic, and to totally reflect incident light therein due to a difference between a refractive index of the rod and a refractive index of a surrounding area of the rod.

11. The illuminator as claimed in claim 8, wherein the optical integrator comprises a barrel having an inner space through which incident light passes and a reflective portion formed on an inner wall of the barrel to reflect the incident light into uniform light as the incident light proceeds through the inner space.

12. The illuminator as claimed in claim 1, further comprising an optical fiber to transmit light passing through the aperture and having an incident end portion disposed at a position of the retro-reflective mirror corresponding to the aperture.

13. The illuminator as claimed in claim 12, wherein the optical fiber is formed of glass or plastic and totally reflects light incident on the incident end portion therein.

14. An illuminator comprising:
    a first concave mirror having first and second focal points and having a partially oval shape to reflect light incident thereon from the first focal point and a vicinity of the first focal point to proceed toward the second focal point and the vicinity of the second focal point;
    a first inner reflective mirror disposed on an optical axis of the first concave mirror to reflect incident light toward the first concave mirror;
    a first light source installed substantially at the first focal point on the first inner reflective mirror to generate and emit light;
    a retro-reflective mirror provided in the vicinity of the second focal point and having an aperture to pass some of light illuminated from the first light source and reflected by the first concave mirror therethrough and a retro-reflective surface to reflect remaining light of the incident light;

a second concave mirror arranged to face the first concave mirror, having a partially oval shape, and having a third focal point and a fourth focal point substantially disposed at the same position of the second focal point, to focus light from the retro-reflection surface on the third focal point or a vicinity of the third focal point and to reflect light incident thereon from the third focal point or the vicinity of the third focal point toward the fourth focal point; and a second inner reflective mirror disposed on an optical axis of the second concave mirror to reflect incident light toward the second concave mirror.

15. The illuminator as claimed in claim 14, further comprising:

a second light source installed substantially at the third focal point on the second inner reflective mirror to generate and emit light.

16. The illuminator as claimed in claim 15, wherein each of the first and second light sources comprises a light emitting diode.

17. The illuminator as claimed in claim 16, wherein each light emitting diode comprises a light emitting surface equal to or greater than a size of 0.5×0.5 mm$^2$.

18. The illuminator as claimed in claim 16, wherein each light emitting diode illuminates light of one of a white, a red, an orange, a yellow, a green, a cyan, a blue, a violet, an infrared, and an ultraviolet wavelength.

19. The illuminator as claimed in claim 14, wherein the second concave mirror is installed to be inclined with respect to the first concave mirror such that a segment connecting the first and second focal points and a segment connecting the third and fourth focal points forms a predetermined angle, and a space is formed between the first and second inner reflective mirrors.

20. The illuminator as claimed in claim 19, further comprising:

a second light source substantially installed at the third focal point on the second inner reflective mirror to illuminate light.

21. The illuminator as claimed in claim 20, further comprising:

a heat sink provided between the first and second inner reflective mirrors to dissipate heat generated from the first and second light sources.

22. The illuminator as claimed in claim 14, wherein each of the first and second inner reflective mirrors comprises a flat mirror having at least one surface arranged parallel to an optical axis of the respective first and second concave mirrors.

23. The illuminator as claimed in claim 14, wherein the retro-reflective surface is flat and arranged perpendicular to an optical axis of incident light, and the aperture is provided at a central portion of the retro-reflective surface and has one of a slit shape, a polygonal shape, a rectangular shape, and a circular shape.

24. The illuminator as claimed in claim 14, further comprising an optical integrator provided on a proceeding path of light passing through the aperture of the retro-reflective mirror to emit uniform light by mixing incident light.

25. The illuminator as claimed in claim 24, wherein the optical integrator comprises an incident end portion disposed at a position of the retro-reflective mirror to allow light passing through the aperture to be incident on the optical integrator.

26. The illuminator as claimed in claim 24, wherein the optical integrator comprises a rod having a rectangular shape and formed of glass or plastic to totally reflect incident light therein due to a difference in a refractive index of the rod and a refractive index of a surrounding area of the rod.

27. The illuminator as claimed in claim 24, wherein the optical integrator comprises a barrel encompassing an inner space through which incident light passes and a reflective portion formed on an inner wall of the barrel to reflect incident light into uniform light as the incident light passes through the inner space.

28. The illuminator as claimed in claim 14, further comprising an optical fiber to transmit the light passing through the aperture and having an incident end portion disposed at a position of the retro-reflective mirror corresponding to the aperture.

29. The illuminator as claimed in claim 28, wherein the optical fiber is formed of glass or plastic totally reflect light incident on the incident end portion therein.

30. An illuminator, comprising:

a concave reflecting unit to reflect light incident thereon toward a vicinity of a target point and having a concave reflecting unit divider to divide the concave reflecting unit into a first concave reflecting unit and a second concave reflecting unit; and a retro-reflecting unit including an aperture disposed at the target point to pass a portion of the light reflected from the concave reflecting unit therethrough and a retro-reflecting surface to reflect a remaining portion of the light reflected from the concave reflecting unit back towards the concave reflecting unit to be incident thereon.

31. The illuminator as claimed in claim 30, wherein the concave reflecting unit comprises:

an elliptical mirror to reflect light incident thereon toward one of a first focal point and a second focal point disposed at the target point; and an inner reflective mirror surface of the concave reflecting unit divider extending from the elliptical mirror through the first focal point to reflect the light reflected by the elliptical mirror toward the first focal point back to the elliptical mirror to be reflected toward the second focal point.

32. The illuminator as claimed in claim 30, wherein the concave reflecting unit comprises:

a first concave mirror surface of the first concave reflecting unit having a first focal point and a second focal point disposed at the target point and to reflect light incident thereon toward one of the first focal point and the second focal point;

a second concave mirror surface of the first concave reflecting unit having a third focal point and a fourth focal point disposed at the target point and to reflect light incident thereon toward one of the third focal point and the fourth focal point;

a first inner reflective mirror surface of the concave reflecting unit divider extending from the first concave mirror surface through the first focal point to reflect the light reflected by the first concave mirror surface toward the first focal point back to the first concave mirror surface to be reflected toward the second focal point; and a second reflective mirror surface of the concave reflecting unit divider extending from the second concave mirror surface through the third focal point to reflect the light reflected by the second concave mirror surface toward the third focal point back to the concave mirror surface to be reflected to the fourth focal point.

33. The illuminator as claimed in claim 32, wherein the first and second inner reflective mirror surfaces are adjacent to and contacting one another.

34. An illuminator, comprising:
a first reflecting unit to reflect light incident thereon to a target point and a vicinity of the target point;
a second reflecting unit to reflect light incident thereon to the target point and the vicinity of the target point; and
a retro-reflecting unit having an aperture disposed at the target point to pass a portion of the light emitted from the first and second reflecting units therethrough and a retro-reflective surface surrounding the aperture to reflect a portion of the light reflected by the first reflecting unit and not passing through the aperture toward the second reflecting unit and to reflect a portion of the light reflected by the second reflected unit and not passing through the aperture toward the first reflecting unit.

35. The illuminator as claimed in claim 34, wherein:
the first reflecting unit comprises a first curved reflecting surface having a first focal point and a second focal point disposed at the target point to reflect light incident thereon from one of the first and second focal points and a vicinity thereof toward the other one of the first and second focal points and a vicinity thereof and a first flat reflecting surface extending from the first curved reflecting surface through the first focal point and the vicinity thereof to reflect light incident thereon toward the first curved reflecting surface; and
the second reflecting unit comprises a second curved reflecting surface having a third focal and a fourth focal point disposed at the same position as the target point to reflect light incident thereon from one of the third and fourth focal points and a vicinity thereof toward the other one of the third and fourth focal points and a vicinity thereof and a second flat reflecting surface extending from the second curved reflecting surface through the third focal point and the vicinity thereof to reflect light incident thereon toward the second curved reflecting surface.

36. The illuminator as claimed in claim 34, wherein the first and second reflecting units are arranged to be adjacent to and contacting each other.

37. The illuminator as claimed in claim 1, wherein the light source comprises at least one light emitting diode installed on a surface that is planar to the reflective surface of the inner reflective mirror.

38. The illuminator as claimed in claim 1, wherein the inner reflective mirror is of a semicircular shape having a curved inner edge surface with two ends connected by one outer edge surface.

39. The illuminator as claimed in claim 1, wherein the curved inner edge surface of the inner reflective mirror corresponds to and abuts with the concave mirror along the entire curved inner edge surface.

40. The illuminator as claimed in claim 30, wherein the concave reflecting unit divider is installed at an optical axis of the concave reflecting unit.

41. The illuminator as claimed in claim 30, wherein a light source is installed on one side of the reflecting unit divider.

42. The illuminator as claimed in claim 41, wherein the light source is installed on a side of the concave reflective unit divider to direct light away from one of the first concave reflecting unit or the second concave reflecting unit.

43. The illuminator as claimed in claim 41, wherein the light source is installed within the first concave reflecting unit and the divider blocks light emitted from the light source from entering the second concave reflecting unit.

44. The illuminator as claimed in claim 41, wherein one of the first concave reflecting unit or the second concave reflecting unit does not contain a light source to generate light.

* * * * *